United States Patent [19]

Saltzberg

[11] Patent Number: 4,881,059
[45] Date of Patent: Nov. 14, 1989

[54] MANCHESTER CODE RECEIVER

[75] Inventor: Burton R. Saltzberg, Middletown, N.J.

[73] Assignees: American Telephone and Telegraph Company, New York, N.Y.; AT&T Information Systems Inc., Morristown, N.J.

[21] Appl. No.: 143,244

[22] Filed: Dec. 30, 1987

Related U.S. Application Data

[63] Continuation-in-part of Ser. No. 44,267, Apr. 30, 1987, abandoned.

[51] Int. Cl.[4] .............................................. H03M 5/12
[52] U.S. Cl. ........................................ 341/70; 375/55; 375/87; 360/42
[58] Field of Search ...................... 341/70; 375/55, 87, 375/101; 360/42

[56] References Cited

U.S. PATENT DOCUMENTS

| | | | |
|---|---|---|---|
| 3,967,061 | 6/1976 | Dobias | 178/69.5 R |
| 3,967,062 | 6/1976 | Dobias | 178/69.5 R |
| 3,979,746 | 9/1976 | Jarrett | 340/347 DD |
| 4,185,273 | 1/1980 | Gowan | 340/347 DD |
| 4,292,626 | 9/1981 | Smithlin | 341/70 |
| 4,350,973 | 9/1982 | Petryk, Jr. | 340/347 DD |
| 4,507,794 | 3/1985 | Jones | 340/347 DD |
| 4,573,169 | 3/1986 | van Gerwen | 375/87 |
| 4,603,322 | 7/1986 | Blair | 375/87 |
| 4,688,232 | 8/1987 | Fox | 375/87 |

FOREIGN PATENT DOCUMENTS 0086213  6/1980  Japan ................................. 375/101

*Primary Examiner*—William M. Shoop, Jr.
*Assistant Examiner*—G. Romano
*Attorney, Agent, or Firm*—John A. Caccuro

[57] ABSTRACT

An improved Manchester code receiver is disclosed which samples the received signal and subtracts from that sample a previous sample of the received signal delayed by a half-bit time interval. A timing extractor selects sample timing from the central zero crossing of the received signal. The sample time is selected to be a quarter-bit time after the zero crossing time of the received signal.

10 Claims, 4 Drawing Sheets

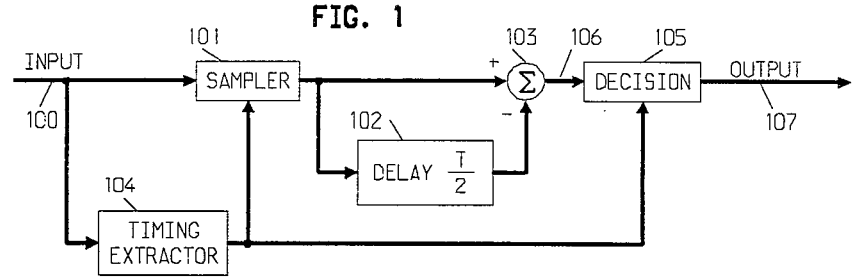
FIG. 1
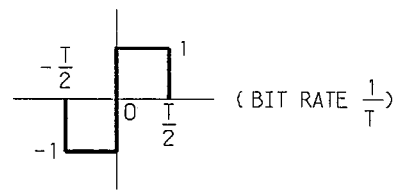
FIG. 2
FIG. 3
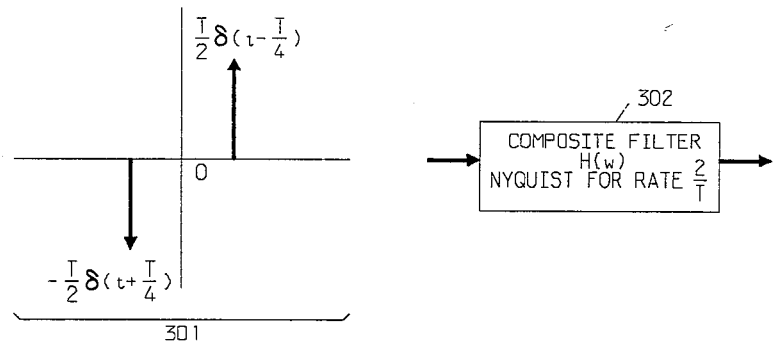

MANCHESTER CODE RECEIVER

This application is a continuation-in-part of application Ser. No. 044,267, filed Apr. 30, 1987, now abandoned.

FIELD OF THE INVENTION

This invention relates to data receiver circuits and, more particularly, to a receiver for and method of recovering a Manchester encoded signal.

BACKGROUND OF THE INVENTION

Manchester coding has long been popular for low-cost short distance data communication applications despite its inefficient use of bandwidth. In one application, Manchester coding is used in some local area networks to provide data transmission over an unshielded twisted pair cable. The coder's most desirable property is the presence of a zero crossing in the center of every bit period. This property permits both low-cost clock timing recovery and very fast start-up from a no signal condition. The latter benefit is particularly important in multiple user configurations such as local area networks.

Commercially available Manchester receivers operate by sampling the received signal at either one-quarter bit before or after mid-bit time period. Because of the popularity of Manchester coding for data transmission, there is a continuing need to improve the signal-to-noise (S/N) ratio of the received signal and reduced intersymbol interference.

SUMMARY OF THE INVENTION

In accordance with the apparatus and method of operation of the present invention, an improved Manchester code receiver operation results by sampling the received signal and subtracting from that sample a previous sample of that signal delayed by a half-bit time (0.5T) interval. A timing extractor selects timing from the central zero crossing of the received signal. A sampler circuit samples the input signal at the selected signal zero crossing time plus 0.25T seconds. The resulting Manchester code receiver offers improved performance in the presence of noise and linear distortions.

BRIEF DESCRIPTION OF THE DRAWING

In the drawings,

FIG. 1 shows a block diagram of a Manchester code receiver in accordance with the present invention;

FIG. 2 shows a typical Manchester encoded signal;

FIG. 3 shows a generalized band-limited Manchester encoded signal;

DETAILED DESCRIPTION

Figure 4:
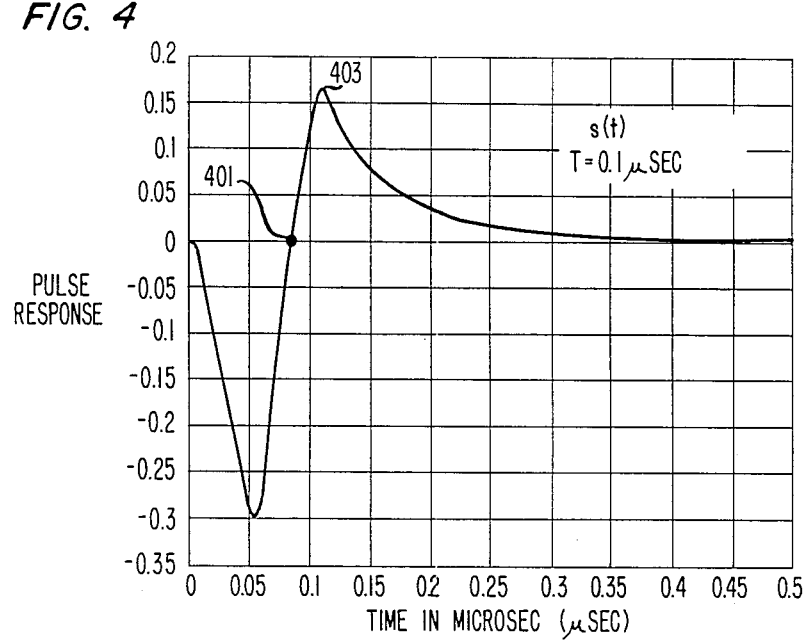
FIG. 4 shows an input signal s(t) to the disclosed Manchester code receiver which is received over a linear channel or a facility in response to a generalized band-limited Manchester encoded signal inputted thereto.

Referring now to FIG. 1, there is shown a block diagram of a Manchester code receiver in accordance with the present invention. The input terminal 100 receives a Manchester encoded signal from a digital communication facility (wire, cable, etc.), magnetic recording source (disk, tape, etc.), or other source. If an optical signal is received over a fiber optic facility, an optical converter is needed to convert the Manchester encoded optical signal into an electrical signal for input to the disclosed receiver. Alternatively, the present invention may be implemented using optical components which perform optical functions in a manner equivalent to the electrical functions performed by the components of the disclosed receiver.

Shown in FIG. 2 is a representation of a typical transmitted Manchester encoded signal. Transmission of this signal or its negative is the most common form of Manchester signaling. This signal achieves binary communication at a bit rate of 1/T.

The Fourier transform of the waveform shown in FIG. 2 is:

$$F(\omega) = -\frac{4j}{\omega} \sin^2 \frac{\omega T}{4}. \quad (1)$$

The first null of (1) is $\omega = 4\pi/T$, which is four times the Nyquist rate for a basic binary system of rate 1/T. This is indeed exorbitant use of system bandwidth.

Bandwidth occupancy can be improved somewhat by the use of standard pulse shaping techniques at the transmitter. While no transmit signal filtering is required for use with the present receiver, any type of transmit signal filtering may be utilized without modification to the present receiver.

In FIG. 3 a well-known band-limited Manchester signal is generated by passing a pair of impulses 301 through a linear filter $H(\omega)$ 302, which is the Nyquist filter that would be used by an encoded non-return-to-zero system operating at rate 2/T. The spectral bandwidth is now only twice that of a standard data transmission channel, such as the commonly used voice grade channels. Note, the analysis and figures described in the remainder of this specification use the typical for of Manchester signal shown in FIG. 2, transmitted over a wire pair, which is a linear transmission system. Because the band-limited Manchester signal 301 and linear filter 302 of FIG. 3 may be considered as an approximate equivalent of the typical Manchester signal shown in FIG. 2, the analysis and figures would likewise be applicable thereto.

The amplitude spectrum of the band-limited form of the Manchester signal is $$F(\omega) = -jT \sin \omega \frac{T}{4} H(\omega). \quad (2)$$

Because of the Nyquist property of $H(\omega)$, $$f(t) = 0, \quad t = (n \pm \tfrac{1}{4})T, \quad n = \pm 1, \pm 2, \quad (3)$$

If $H(\omega)$ is real, $F(\omega)$ is pure imaginary, f(t) is odd, then f(0)=0, preserving the mid-bit zero crossing that is the Manchester code's important characteristic.

Equation 3 states that the signal may be sampled at either one-quarter bit before or after mid-bit time period without intersymbol interference. In accordance with the present invention, the signal sample at both of these instants are utilized by using a matched filter in the receiver to obtain optimum signal detection.

With the pulse pair of FIG. 3, if the transmit filter, the transmission channel and the receive filter form a linear system with overall impulse respose g(t), then the received signal presented to the input terminal 100 of a Manchesterreceiver is $$s(t) = \sum_{k=-\infty}^{\infty} a_k \left\{ g\left(t - \left[k + \frac{1}{4}\right]T\right) - g\left(t - \left[k - \frac{1}{4}\right]T\right) \right\} + n(t) \quad (4)$$

where $\alpha_n$ is the binary information sequence and n(t) is an additive filtered noise. A typical representation of signal s(t), after transmission over a wire pair, is illustrated in FIG. 4 for a single Manchester signal shown in FIG. 2 having a 10 megabit data rate, i.e., T=0.1 microseconds ($\mu$sec).

The origin is conveniently chosen at the epoch where $E[\alpha_0 s(t)] = 0$, which implies that $$g(T/4) = g(-T/4). \quad (5)$$

With this choice of time origin, the $\alpha_o$ is detected as the sign of $$s\left(\frac{T}{4}\right) = a_0 h_r(0) + \sum_{k \neq 0} a_{-k} h_r(kT) + n\left(\frac{T}{4}\right) \quad (6a)$$

where $$h_r(t) = g(t) - g(t + T/2) \quad (6b)$$

or as the sign of $$-s\left(-\frac{T}{4}\right) = a_0 h_l(0) + \sum_{k \neq 0} a_{-k} h_l(kT) + n\left(-\frac{T}{4}\right) \quad (7a)$$

where $$h_l(t) = g(t) - g(t - T/2). \quad (7b)$$

The "eye" pattern (not illustrated) of the received signal s(t) as seen on an oscilloscope would contain two eyes per bit interval. Equation (6a) corresponds to sampling the right eye, while equation (7a) corresponds to sampling the left eye.

The following paragraphs describe how the present improved Manchester code receiver detects the received signal s(t). In the following description, each item of each figure has a reference designation associated therewith, the first number of which refers to the figure in which that item is first mentioned (e.g., 110 is located in FIG. 1).

The following description makes joint reference to FIGS. 1, 3, 5 and 6. In accordcance with the present invention, an improved Manchesfter receiverFIG. 1 results when sampler 101 obtains a sample of the received signal s(t), FIG. 4, which is delayed (102) by a half-bit interval (T/2) and subtracted (103) from a current sample of the received signal s(t). This approach represents a matched filter approach to detection of the received signal s(t).

Figure 5:
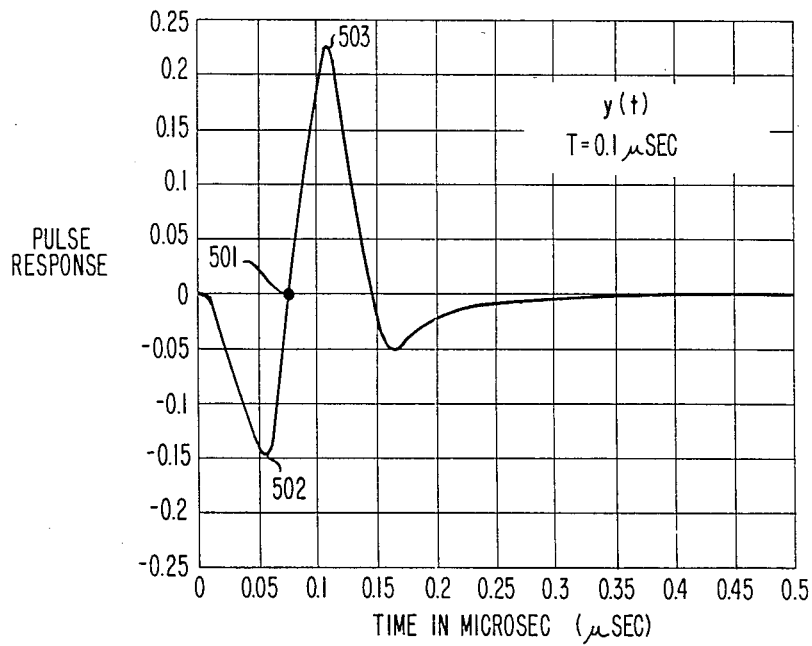
FIG. 5 shows a combined signal generated by a delay and subtraction operations; and P
Figure 6:
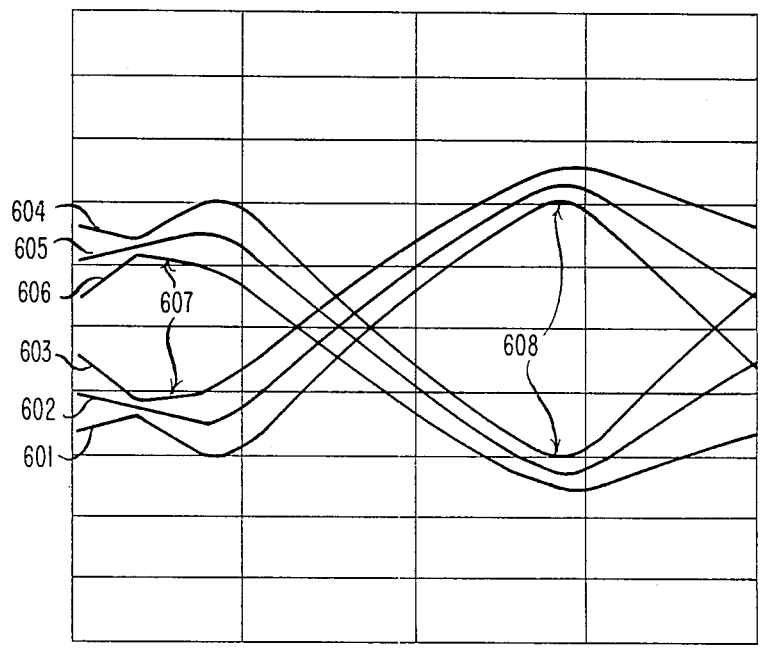
FIG. 6 shows an "eye" pattern outline for the signal of FIG. 5.

Although sampling 101 occurs before the delay 102 and subtract 103 operation in the present invention, it it mathematically convenient to consider a signal y(t) that would result from subtracting a replica of the input signal, delayed by T/2, from the received signal. This combined signal y(t) is shown in FIG. 5. The corresponding eye pattern is shown in FIG. 6. It should be noted that sampling of y(t) would produce the same values that occur at the output of the subtracter in the present invention.

In FIG. 1, the received signal 100 is sampled by sampler 101 at time intervals spaced by half the bit interval, T/2. The timing instants are governed by timing extractor circuit 104, which detects zero crossing of the received signal 100 and which controls the sampler 101 sampling times so as to occur T/4 before and after the central zero crossing.

Delay circuit 102 delays the output of sampler 101 by T/2 and subtracter circuit 103 subtracts this delayed sample from the next output of the sampler. Decision circuit 105 generates the output data signal 107 so as to agree with the sign of the output 106 of the subtracter 103. The decision circuit 105 is pulsed by the output of the timing extractor 104 so as to generate a new binary output 107 once during each bit interval T.

The equation for the output 106 of the subractor 103 is:

$$y(T/4) = \frac{1}{2}[s(T/4) - s(-T/4)] \quad (8)$$

and the output data 107 is generated to agree with the sign of y(T/4). The factor of $\frac{1}{2}$ is strictly for mathematical normalization, and is not needed in an actual implementation.

The receiver circuits may be implemented using either well-known analog sample circuits or well-known digital circuits. In an analog implementation, sampler 101 generates an analog output sample equal to the value of its input signal at the time instant of the output of the timing extractor. The delay circuit 102 may be a well-known sample and hold circuit, which retains an analog value until the following sampling instant. The subtracter 103 can also be a well-known device to be followed by a decision circuit 105 which can be implemented using a well-known threshold circuit.

Alternatively, the received sample can be converted to a sequence of digital bits using any well-known analog-to-digital conversion circuit. The delay can then be implemented to include digital storage. Subtraction can be implemented using well-known digital arithmetic circuits, and the decision circuit would then consist of extracting the most significant bit of the subtraction result.

Clearly, any mix of the above-described analog and digital techniques, and well-known variations of them, can be used to implement the present invention.

The technique subtracting a delayed sample of the received signal 100 from a current sample is equivalent to sampling the original input both before and after the central zero crossing, and choosing the sample which is larger in magnitude. This leads to less noise and intersymbol interference than using either one of the input samples alone.

NOISE INTERFERENCE

In the absence of intersymbol interference, the received samples in the basic detector are $$s(\pm T/4) = \pm a_0 g(0) + n(\pm T/4). \quad (9)$$

In either case, the signal to noise power ratio at the sample is $$(S/N)_b = \frac{g^2(0)}{\sigma_n^2} \quad (10)$$

For the modified receiver under the same conditions, $$y(T/4) = \tfrac{1}{2} a_0 g(0) + n(T/4) + a_0 g(0) - n(-T/4)$$
$$= a_0 g(0) + \tfrac{1}{2} n(T/4) - n(-T/4) \quad (11)$$

The signal to noise ratio in this case is $$(S/N)_m = \frac{g^2(0)}{\tfrac{1}{2}\sigma_m^2 - \tfrac{1}{2} E\left[n\left(\tfrac{T}{4}\right) n\left(-\tfrac{T}{4}\right)\right]} \quad (12)$$

Letting $R_n(\tau)$ be the normalized autocorrelation of the noise, $$R_n(\tau) = \frac{E[n(t)n(t+\tau)]}{\sigma_n^2} \quad (13)$$

$$(S/N)_m = \frac{2}{1 - R_n\left(\tfrac{T}{2}\right)} \cdot \frac{g^2(0)}{\sigma_n^2} \quad (14)$$

$$= \frac{2}{1 - R_n\left(\tfrac{T}{2}\right)} (S/N)_b.$$

If the noise is white, then 3 dB improvement is obtained over the S/N ratio for received signal s(t) as shown in equation (10). Greater improvement occurs when the noise is positively correlated Since $|n(\tau)| \leq 1$, in no case can the performance be worse, even if the noise is negatively correlated.

The improvement in noise performance is a result of using a matched filter matched to the original impulse pair signal shown in FIG. 3. The delay and subtract function is equivalent to a filter of impulse response $\delta(t) - \delta(t - T/2)$. This is a time shifted reverse of the input to the transmit filter, $\delta(t - T/4) - \delta(t + T/4)$.

INTERSYMBOL INTERFERENCE COMPARISON

The equation analogous to (6) or (7) for the combined signal y(t) used by the present Manchester code receiver is $$y\left(\frac{T}{4}\right) = a_0 h_m(0) + \sum_{k \neq 0} a_k h_m(kT) + n'\left(\frac{T}{4}\right) \quad (15a)$$

where $$h_m(t) = g(t) - \tfrac{1}{2} g(t + T/2) - \tfrac{1}{2} g(t - T/2). \quad (15b)$$

It is difficult to form general conclusions as to any reduction of intersymbol interference by the present receiver of FIG. 1. However, it should be noted that the interfering quantities given by (15b) consists of the difference between samples and the average of samples a half-bit time before and after that sample. Since combined signal y(t) is sampled at approximately 503 and since signal s(t) is typically sampled at 403, it is apparent that the difference between these samples and the respective average of samples taken a half-bit time before and after would indicate that y(t) should exhibit a smaller intersymbol interference characteristic than s(t).

Figure 7:
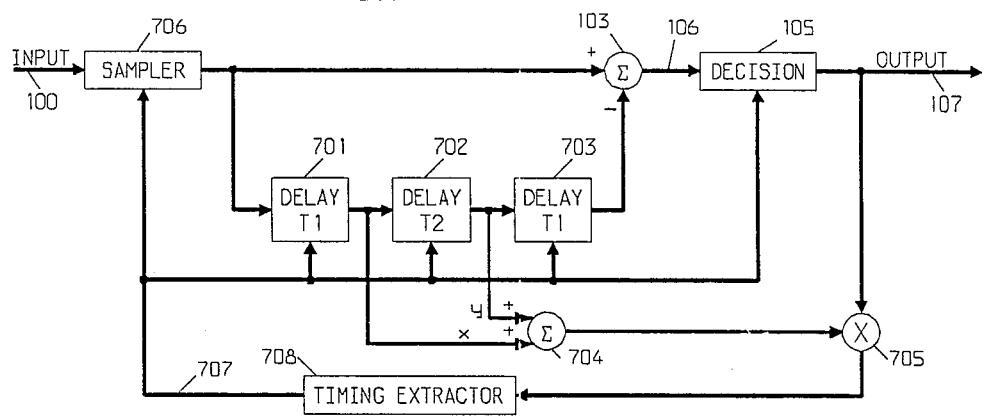
FIG. 7 shows another embodiment of the Manchester code receiver in accordance with the present invention.
Figure 8:
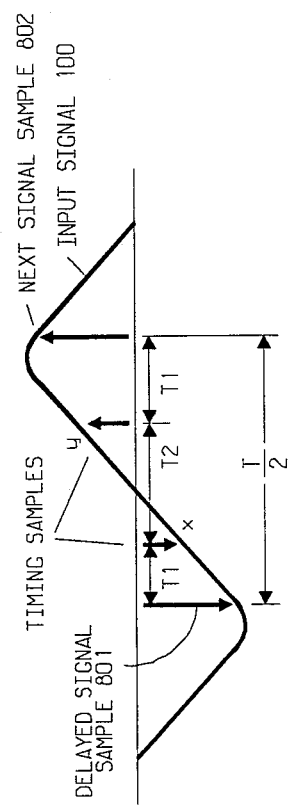
FIG. 8 shows a method of obtaining the central zero crossing time of a sampled input signal.

The following description makes reference to FIGS. 7 and 8. The sampler circuit 706 operates in a similar manner to sampler 101 of FIG. 1 except that two timing samples, x and y, are generated, respectively, at T1 seconds after the delayed signal sample 801 and T/2−T1 seconds after the delayed sample 801.

Auxiliary outputs of timing extractor 708 are generated to produce these timing intervals of T1 and T/2−T1 after the signal sample time instants generated by the timing extractor 708. In addition to the signal sampling time instants generated by timing extractor 708, auxiliary instants T1 and T/2−T1 occurring after those instants must also be generated by the timing extractor 708. Note the signal sample 802 represents the next signal sample of input signal 100. The timing samples are outputted to a delay circuit which includes three delay units, 701–703, in FIG. 7 whose delays sum to T/2. Note, the timing samples and delayed timing samples are added by summer 103. However, decision circuit 105 ignores the timing sample sums and produces an output only in response to the signal samples 801 and 802.

The first delay 701 and last delay 703 are equal, and the total delay is equal to T/2. Illustratively, a good choice would be T1=T/8, T2=T/4.

As shown in FIG. 8, timing sample values, x and y, are on either side of the central zero crossing of the input signal 100. The timing extractor 708 includes means for adjusting the sample time signal 707 so that the amplitude of timing samples x and y are equal and opposite.

The input signal 100 shown in FIG. 8 assumes that a logic 1 signal was transmitted so that sample x is negative and sample y is positive. Summing circuit 704 sums samples x and y. Multiplier 705 multiplies the output of summer 704 by 1 when the input signal 100 is a logic 1. If a logic 0 signal is transmitted, the multiplier 705 inverts (i.e., multiplies by −1) the sum so that the output signal to timing extractor 708 is not dependent on whether a logic 0 or 1 is received.

As shown in FIG. 8, assume that the sampling time is too late. Then the sum x+y out of summer 704 will be positive, and the timing extractor 104 will adjust the phase of sample time signal 707 so that the sampling can be advanced. If the sampling time were early, then x+y would be negative and timing extractor 104 would retard the phase of the sample time signal 707. The sampling phase would be adjusted to the point where x+y=0. When x+y=0, then sampling occurs at the central zero crossing of input signal 100. A phase locked loop could serve as the timing extractor 104.

Figure 9:
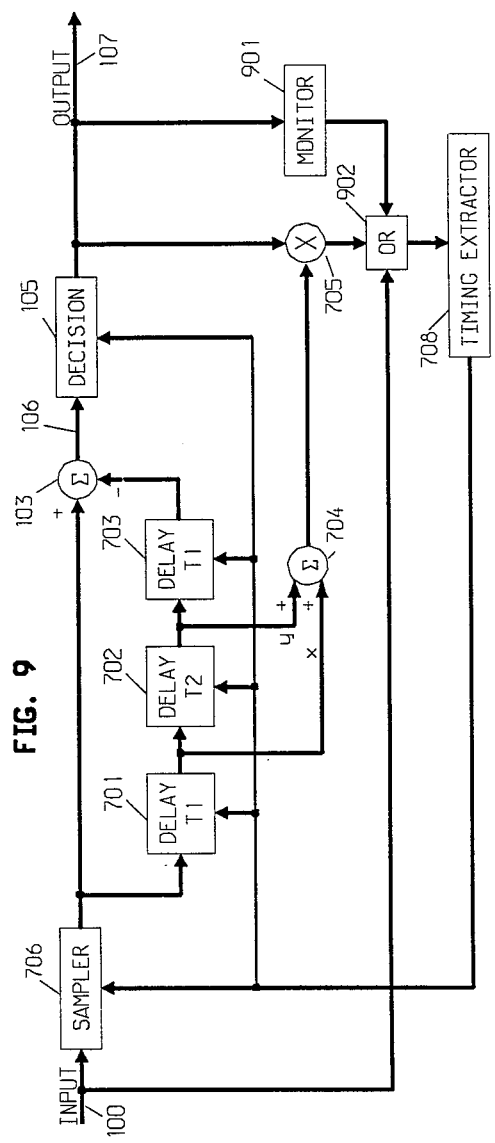
FIG. 9 shows an embodiment of the Manchester code receiver of FIG. 7 with a performance monitor circuit added thereto.

FIG. 9 shows the system including a monitor, 901, which controls selection circuit 902 to select either the input signal 100 or the output of multiplier 705 as the optimum input for timing extractor circuit 104.

According to this aspect of the present invention, a performance monitor circuit 901, responsive to a detected error rate or other transmission impairment measure in the receiver, may control selector circuit 902 to select the signal to be connected to timing extractor 708. Monitor circuit 901, illustratively, may monitor the noise error rate or other transmission performance characteristic. Moreover, monitor circuit 901 may also select the optimum delay in either or both the delay circuits 701–703 and timing extractor circuit 104 to optimize transmission performance in a particular system.

What has been described is merely illustrative of the application of the principles of the present invention. Other methods and circuits can be implemented by those skilled in the art without departing from the spirit and scope of the present invention.

What is claimed is:

1. A Manchester code receiver comprising
    input means for receiving a Manchester encoded data signal,
    sampling means for generating samples of said data signal,
    delay means connected to said sampling means for delaying said data signal samples by a predetermined fraction of the time period of said data signal, and
    subtracter means for subtracting a delayed data sample outputted from said delay means from said data signal sample generated by said sampling means.

2. The Manchester code receiver of claim 1 further comprising
    a timing extractor means for selecting a sample time dependent on a zero crossing time of said received Manchester encoded data signal, and for controlling a sampling time of said sampling means.

3. The Manchester code receiver of claim 2 wherein said sample time of said timing extractor means occurs approximately T/4 seconds before and after a zero crossing time of said data signal.

4. The Manchester code receiver of claim 1 wherein said predetermined fraction is approximately T/2 seconds.

5. A Manchester code receiver of claim 1 wherein said delay means is an analog sample and hold circuit.

6. A Manchester code receiver of claim 1 wherein said sampling means generates a digital representation of said data signal, and
    said delay means includes digital storage means, and
    said subtracter means is a digital subtracter.

7. The Manchester code receiver of claim 2 wherein said delay means includes
    a first delay circuit having a delay of T1 seconds,
    a second delay circuit connected to the output of said first delay circuit and having a delay of T2 seconds,
    a third delay circuit connected to the output of said second delay circuit and having a delay of T1 seconds, and
    wherein said timing extractor means includes
    means for combining the outputs of said first delay circuit and of said second delay circuit and
    means for adjusting said sample time in response to a signal received from said combining means.

8. The Manchester code receiver of claim 7 wherein the sum of said delays T1, T2 and T1 is equal to approximately T/2 seconds.

9. The Manchester code receiver of claim 7 wherein
    said timing extractor means selects a sample time dependent on a zero crossing time of a data signal connected to an input thereof,
    a monitor circuit for determining a data transmission performance parameter and outputting a control signal in response thereto, and
    selector means responsive to a first state of said control signal for connecting the input of said timing extractor means to said received encoded data signal and responsive to a second state of said control signal for connecting the input of said timing extractor means to an output signal from said combining means.

10. A method of operating a Manchester code receiver comprising the steps of:
    receiving a Manchester encoded data signal,
    generating data samples of said data signal,
    delaying said data samples by a predetermined fraction of the time period of said data signal, and
    subtracting a delayed data sample resulting from said delaying step from next said data sample.

* * * * *